United States Patent
Xu

(10) Patent No.: US 10,856,337 B2
(45) Date of Patent: Dec. 1, 2020

(54) METHOD AND APPARATUS FOR RANDOM ACCESS IN WIRELESS COMMUNICATION SYSTEM AND USER TERMINAL

(71) Applicant: ZTE Corporation, Guangdong (CN)

(72) Inventor: Jing Xu, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/274,204

(22) Filed: Feb. 12, 2019

(65) Prior Publication Data
US 2019/0191466 A1    Jun. 20, 2019

Related U.S. Application Data

(63) Continuation of application No. PCT/CN2017/078184, filed on Mar. 24, 2017.

(30) Foreign Application Priority Data

Aug. 12, 2016  (CN) .......................... 2016 1 0667989

(51) Int. Cl.
*H04W 74/08* (2009.01)
*H04W 48/16* (2009.01)
(Continued)

(52) U.S. Cl.
CPC ....... *H04W 74/0883* (2013.01); *H04W 48/16* (2013.01); *H04W 74/006* (2013.01);
(Continued)

(58) Field of Classification Search
CPC . H04W 74/0883; H04W 76/18; H04W 48/16; H04W 74/006; H04W 74/08; H04W 74/0833
See application file for complete search history.

(56) References Cited

U.S. PATENT DOCUMENTS

2018/0176847 A1* 6/2018 Fasil Abdul ........ H04W 72/085
2018/0206271 A1* 7/2018 Chatterjee ............. H04L 5/0053
(Continued)

FOREIGN PATENT DOCUMENTS

CN        104254135 A      12/2014
CN        104349476 A       2/2015
(Continued)

OTHER PUBLICATIONS

3GPP, 3rd Generation Partnership Project; Technical Specification Group Radio Access Network; Evolved Universal Terrestrial Radio Access (E-UTRA); Medium Access Control (MAC) protocol specification (Release 13), 3GPP TS 36.321, v13.2.0, 91 pages, Jun. 2016.
(Continued)

*Primary Examiner* — Luat Phung
(74) *Attorney, Agent, or Firm* — Perkins Coie LLP

(57) ABSTRACT

The present disclosure provides a method and an apparatus for random access in a wireless communication system, as well as a user terminal. The method includes: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access; and re-determining, in response to a failure to initiate the random access over the target PRACH resource, the target PRACH resource from the available resources based on an updated coverage level and the resource information, and transmitting the PRACH signal over the re-determined target PRACH resource. The present disclosure can solve the technical problem in the
(Continued)

related art associated with low success rate of random accesses initiated by radio base stations.

8 Claims, 4 Drawing Sheets

(51) Int. Cl.
  *H04W 74/00* (2009.01)
  *H04W 76/18* (2018.01)
(52) U.S. Cl.
  CPC ....... *H04W 74/08* (2013.01); *H04W 74/0833* (2013.01); *H04W 76/18* (2018.02)

(56) References Cited

U.S. PATENT DOCUMENTS

2019/0174549 A1* 6/2019 Xu ................... H04W 74/0833
2019/0274168 A1* 9/2019 Hwang ................ H04L 5/0012

FOREIGN PATENT DOCUMENTS

| CN | 104704884 A | 6/2015 |
| CN | 105101454 A | 11/2015 |
| WO | 2015102281 A1 | 7/2015 |
| WO | 2015117283 A1 | 8/2015 |

OTHER PUBLICATIONS

3GPP, 3rd Generation Partnership Project; Technical Specification Group Radio Access Network; Evolved Universal Terrestrial Radio Access (E-UTRA); Physical channels and modulation (Release 13), 3GPP TS 36.211, v13.2.0, 168 pages, Jun. 2016.
Extended Search Report dated Jan. 29, 2020 for European Application No. 17838342.8, filed on Mar. 24, 2017 (11 pages).
Korean Office Action dated Mar. 19, 2020 for Korean Patent Application No. 10-2019-7007265, filed on Mar. 24, 2017 (12 pages).
International Search Report and Written Opinion dated May 22, 2017 for International Application No. PCT/CN2017/078184, filed on Mar. 24, 2017 (12 pages).

* cited by examiner

METHOD AND APPARATUS FOR RANDOM ACCESS IN WIRELESS COMMUNICATION SYSTEM AND USER TERMINAL

CROSS REFERENCE TO RELATED APPLICATIONS

This patent application is a continuation of and claims priority to International Patent Application No. PCT/CN2017/078184, filed on Mar. 24, 2017, which claims the benefit of priority of Chinese Patent Application No. 201610667989.0, filed on Aug. 12, 2016. The entire contents of the before-mentioned patent applications are incorporated by reference as part of the disclosure of this application.

TECHNICAL FIELD

The present disclosure relates to communication technology, and more particularly, to a method and an apparatus for random access in a wireless communication system, and to a user terminal.

BACKGROUND

In wireless communication systems such as enhanced Machine Type Communication (eMTC) and Narrow Band Internet of Things (NB-IoT) standard protocols, a base station (e.g., an evolved NodeB (eNodeB)) can initiate a random access process e.g., by transmitting a Physical Downlink Control Channel (PDCCH) order instructing a User Equipment (UE) to initiate a random access process. In this case, the base station can indicate information on Physical Random Access Channel (PRACH) resources to be used by the UE (the PRACH information indicated by the PDCCH order is shown in Table 1). Upon receiving the instruction from the base station, the UE transmits PRACH over the resources indicated by the base station. In the eMTC system, the UE transmits PRACH using a preamble codeword indicated by the base station.

TABLE 1

| eMTC | NB-IoT | Description |
|---|---|---|
| Starting CE Level | Starting number of NPRACH repetitions | Coverage level at which UE transmits PRACH initially, i.e., UE initiates random access over a PRACH resource set corresponding to the coverage level initially |
| PRACH Mask Index | Subcarrier indication of NPRACH | Time-frequency resource index for UE to transmit PRACH (eMTC) Frequency-domain sub-carrier ID for UE to transmit PRACH (NB-IoT) |
| Preamble Index | | Preamble codeword to be used by UE for PRACH |

In the eMTC and NB-IoT systems, PRACH resources are configured depending on coverage levels. Each coverage level corresponds to a set of PRACH time-frequency resources, a number of PRACH repetitions and a number of random accesses. In the eMTC system, a set of preamble codewords is also configured for each coverage level.

For a base station initiated random access process, the PRACH resource index, sub-carrier ID or preamble codeword indicated by the base station is necessarily included in the set of PRACH resources for the initial coverage level, so as to ensure that the UE can initiate a random access process over the PRACH resources indicated by the base station at the initial coverage level. However, when the coverage level needs to be increased after the UE has failed in a number of random accesses over the PRACH resources indicated by the base station, the PRACH resource index, sub-carrier ID or preamble codeword indicated by the base station may not be included in the set of PRACH resources for the higher level. In this case, the UE would not be able to initiate a random access or the UE transmits PRACH according to the PRACH information indicated by the base station but the base station would not respond. In either case, the random access will fail, resulting in a reduced success rate of the base station-initiated random accesses.

There is currently no effective solution to the technical problem in the related art associated with low success rate of random accesses initiated by radio base stations.

SUMMARY

The present disclosure provides a method and an apparatus for random access in a wireless communication system, as well as a user terminal, capable of at least solving the technical problem in the related art associated with low success rate of random accesses initiated by radio base stations.

According to an aspect of the present disclosure, a method for random access in a wireless communication system is provided. The method includes: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access, the current coverage level being a coverage level at which the random access is to be initiated currently, and the available resources being resources allowable to be used at the current coverage level; and re-determining, in response to a failure to initiate the random access over the target PRACH resource, the target PRACH resource from the available resources based on an updated coverage level and the resource information, and transmitting the PRACH signal over the re-determined target PRACH resource.

Optionally, the failure to initiate the random access over the target PRACH resource is determined by: obtaining a number of failures to initiate the random access; and determining the failure to initiate the random access over the target PRACH resource when the number of failures reaches a predetermined value that is a maximum number of transmissions of the PRACH signal allowable at the current coverage level.

Optionally, the method further includes: retransmitting, after obtaining the number of failures to initiate the random access, the PRACH signal over the target PRACH resource when the number of failures is smaller than the predetermined value.

Optionally, the updated coverage level is one level higher than the coverage level before updating.

Optionally, the target PRACH resource includes a target time-frequency resource, a target codeword and a target sub-carrier for transmitting the PRACH signal. The operation of determining the target PRACH resource from the available resources based on the current coverage level and the resource information carried in the indication information includes: mapping the resource information to the target PRACH resource from resources available at the current coverage level.

Optionally, when the wireless communication system is an enhanced Machine Type Communication (eMTC) system, the operation of mapping the resource information to the target PRACH resource from resources available at the current coverage level includes: determining the target time-frequency resource based on a number of time-frequency resources available at the current coverage level and a time-frequency resource index in the resource information; and/or determining the target codeword based on a start codeword and an end codeword of preambles at the current coverage level and a preamble index in the resource information.

Optionally, the operation of determining the target time-frequency resource based on the number of time-frequency resources available at the current coverage level and the time-frequency resource index in the resource information includes: calculating a first index, ID2, based on the number, Num1, of the available time-frequency resources and the time-frequency resource index, ID1, in the resource information according to a predetermined equation of ID2=(ID1−K1)mod(Num1)+K2 or ID2=(ID1)mod(Num1)+K3, where K1, K2 and K3 are constants; and determining a time-frequency resource corresponding to ID2 as the target time-frequency resource.

Optionally, the operation of determining the target codeword based on the start codeword and the end codeword of the preambles at the current coverage level and the preamble index in the resource information includes: calculating a second index, ID6, based on an index, ID3, of the start codeword, an index, ID4, of the end codeword and the preamble index, ID5, as ID6=ID3+(ID5)mod(ID4-ID3+1), or calculating the second index ID6 based on the index ID3 of the start codeword, the index ID4 of the end codeword and a start codeword index, ID9, corresponding to a coverage level indicated in the indication information, as ID6=ID3+(ID5−ID9)mod(ID4−ID3+1); and determining a codeword corresponding to ID6 as the target codeword.

Optionally, when the wireless communication system is a Narrow Band Internet of Things (NB-IoT) system, the operation of mapping the resource information to the target PRACH resource from resources available at the current coverage level includes: determining the target sub-carrier based on a number of sub-carriers and an index of a start sub-carrier at the current coverage level and a sub-carrier index or offset in the resource information.

Optionally, the operation of determining the target sub-carrier based on the number of sub-carriers and the index of the start sub-carrier at the current coverage level and the sub-carrier index or offset in the resource information includes: calculating a third index, ID8, based on the number, Num2, of sub-carriers and the index, ID7, of the start sub-carrier at the current coverage level and the sub-carrier offset, Num3, in the resource information, as ID8=ID7+(Num3)mod(Num2), or calculating the third index, ID8, based on the number Num2 of sub-carriers and the index ID7 of the start sub-carrier at the current coverage level, the sub-carrier index Num3 in the resource information and a start sub-carrier index, ID10, corresponding to a coverage level indicated in the indication information, as ID8=ID7+(Num3-ID10)mod(Num2); and determining the sub-carrier corresponding to ID8 as the target sub-carrier.

Optionally, when the wireless communication system is an eMTC system or an NB-IoT system, the indication information is PDCCH order information.

Optionally, when the wireless communication system is an eMTC system, the indication information is handover information.

According to another aspect of the present disclosure, an apparatus for random access in a wireless communication system is provided. The apparatus includes: a receiving unit configured to receive indication information transmitted from a radio base station, the indication information instructing a user terminal to initiate a random access; a determining unit configured to determine a target Physical Random Access Channel (PRACH) resource from available resources based on a current coverage level and resource information carried in the indication information, the target PRACH resource being used for transmitting a PRACH signal for initiating the random access, and the current coverage level being a coverage level at which the random access is to be initiated currently; and a transmitting unit configured to re-determine, in response to a failure to initiate the random access over the target PRACH resource, the target PRACH resource from the available resources based on an updated coverage level and the resource information, and transmit the PRACH signal over the re-determined target PRACH resource.

Optionally, the transmitting unit includes: an obtaining module configured to obtain a number of failures to initiate the random access; and a first determining module configured to determine the failure to initiate the random access over the target PRACH resource when the number of failures reaches a predetermined value that is a maximum number of transmissions of the PRACH signal allowable at the current coverage level.

Optionally, the transmitting unit further includes: a transmitting module configured to retransmit, after obtaining the number of failures to initiate the random access, the PRACH signal over the target PRACH resource when the number of failures is smaller than the predetermined value.

Optionally, the updated coverage level is one level higher than the coverage level before updating.

Optionally, the target PRACH resource includes a target time-frequency resource, a target codeword and a target sub-carrier for transmitting the PRACH signal. The determining unit is further configured to map the resource information to the target PRACH resource from resources available at the current coverage level.

Optionally, when the wireless communication system is an enhanced Machine Type Communication (eMTC) system, the determining unit includes: a second determining module configured to determine the target time-frequency resource based on a number of time-frequency resources available at the current coverage level and a time-frequency resource index in the resource information; and/or a third determining module configured to determine the target codeword based on a start codeword and an end codeword of preambles at the current coverage level and a preamble index in the resource information.

Optionally, the second determining module is further configured to: calculate a first index, ID2, based on the number, Num1, of the available time-frequency resources and the time-frequency resource index, ID1, in the resource information according to a predetermined equation of ID2=(ID1−K1)mod(Num1)+K2 or ID2=(ID1)mod(Num1)+K3, where K1, K2 and K3 are constants; and determine a time-frequency resource corresponding to ID2 as the target time-frequency resource.

Optionally, the third determining module is further configured to: calculate a second index, ID6, based on an index, ID3, of the start codeword, an index, ID4, of the end codeword and the preamble index, ID5, as ID6=ID3+(ID5)mod(ID4−ID3+1), or calculate the second index ID6 based on the index ID3 of the start codeword, the index ID4 of the end codeword and a start codeword index, ID9, corresponding to a coverage level indicated in the indication information, as ID6=ID3+(ID5−ID9)mod(ID4−ID3+1); and determine a codeword corresponding to ID6 as the target codeword.

Optionally, when the wireless communication system is a Narrow Band Internet of Things (NB-IoT) system, the determining unit includes: a fourth determining unit configured to determine the target sub-carrier based on a number of sub-carriers and an index of a start sub-carrier at the current coverage level and a sub-carrier index or offset in the resource information.

Optionally, the fourth determining module is further configured to: calculate a third index, ID8, based on the number, Num2, of sub-carriers and the index, ID7, of the start sub-carrier at the current coverage level and the sub-carrier offset, Num3, in the resource information, as ID8=ID7+(Num3)mod(Num2), or calculate the third index, ID8, based on the number Num2 of sub-carriers and the index ID7 of the start sub-carrier at the current coverage level, the sub-carrier index Num3 in the resource information and a start sub-carrier index, ID10, corresponding to a coverage level indicated in the indication information, as ID8=ID7+(Num3-ID10)mod(Num2); and determine the sub-carrier corresponding to ID8 as the target sub-carrier.

Optionally, when the wireless communication system is an eMTC system or an NB-IoT system, the indication information is PDCCH order information.

Optionally, when the wireless communication system is an eMTC system, the indication information is handover information.

According to a further aspect of the present disclosure, a user terminal is provided. The user terminal includes a memory storing codes for steps of: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access; and re-determining, in response to a failure to initiate the random access over the target PRACH resource, the target PRACH resource from the available resources based on an updated coverage level and the resource information, and transmitting the PRACH signal over the re-determined target PRACH resource. The user terminal further includes a processor for executing the codes stored in the memory. The user terminal further includes a transmission device connected to the memory and the processor, and configured to transmit the codes in the memory to the processor.

According to yet a further aspect of the present disclosure, a storage medium is provided. The storage medium can be configured to store codes for steps of: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access; and re-determining, in response to a failure to initiate the random access over the target PRACH resource, the target PRACH resource from the available resources based on an updated coverage level and the resource information, and transmitting the PRACH signal over the re-determined target PRACH resource.

In the present disclosure, indication information transmitted from a radio base station is received. The indication information instructs a user terminal to initiate a random access. A target Physical Random Access Channel (PRACH) resource is determined from available resources based on a current coverage level and resource information carried in the indication information. The target PRACH resource is used for transmitting a PRACH signal for initiating the random access. In response to a failure to initiate the random access over the target PRACH resource, the target PRACH resource is re-determined from the available resources based on an updated coverage level and the resource information, and the PRACH signal is transmitted over the re-determined target PRACH resource. In this way, it is possible to solve the technical problem in the related art associated with low success rate of random accesses initiated by radio base stations, thereby achieving a technical effect of an increased success rate of random accesses.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures.

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Embodiment 1

Figure 1:
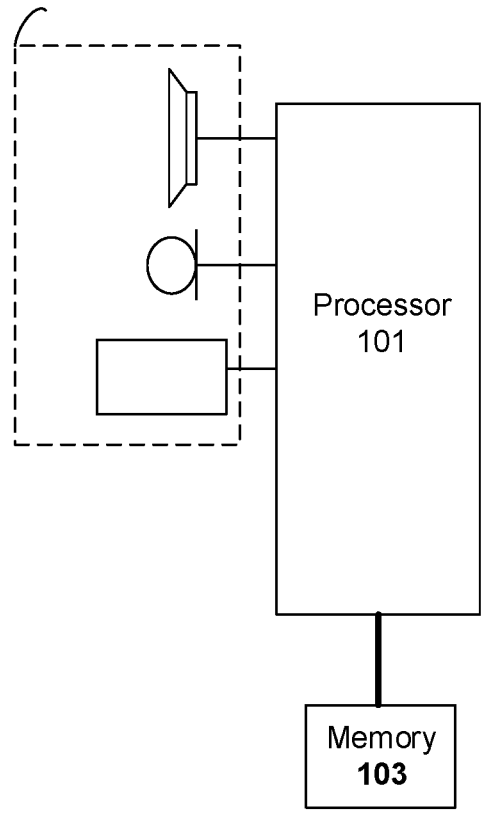
FIG. 1 is a schematic diagram showing an optional user terminal according to the present disclosure.

The method provided according to Embodiment 1 of the present disclosure can be performed in a user terminal, a computer terminal or a similar computing device. When the method is performed in a user terminal for example, as shown in FIG. 1, the user terminal can include: one or more processors 101 (only one is shown, which includes, but not limited to, a processing device like a microprocessor such as MCU or a programmable logic device such as FPGA), a memory 103 for storing data, and a transmission device 105 for providing communication functions. It can be appreciated by those skilled in the art that the structure shown in FIG. 1 is illustrative only, and the structure of the above electronic device is not limited thereto.

The memory 103 can store software programs and modules of software applications, e.g., program instructions/modules associated with the method for device control according to the present disclosure. The processor 101 performs various functional applications and data processing operations, i.e., performing the above method, by executing the software programs and modules stored in the memory 103. The memory may include a random cache or non-volatile memory such as one or more magnetic storage devices, flash memories or other non-volatile solid-state memories. In some examples, the memory may further include one or more memories which are remote from the processor and can be connected to the computer terminal via a network. Examples of such network include, but not limited to, Internet, an intranet of an enterprise, a Local Area Network (LAN), a mobile communication network, and any combination thereof.

It is to be noted that the memory can store codes for steps of: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access and the current coverage level being a coverage level at which the random access is to be initiated currently; and re-determining, in response to a failure to initiate the random access over the target PRACH resource, the target PRACH resource from the available resources based on an updated coverage level and the resource information, and transmitting the PRACH signal over the re-determined target PRACH resource.

The transmission device can transmit or receive data via a network. The network can be e.g., a wireless network provided by a communication provider of the computer terminal. In an example, the transmission device includes a network adaptor, or Network Interface Controller (NIC), which can be connected to other network devices via a base station for communication with Internet. In an example, the transmission device can be a Radio Frequency (RF) module for communicating with Internet wirelessly.

According to an embodiment of the present disclosure, a method for random access in a wireless communication system is provided. It is to be noted that, the steps shown in the flowchart can be performed in a computer system executing a set of computer executable instructions. While a logical sequence order is shown in the flowchart, in some cases the steps as shown or described can be performed in a different order than the one as shown herein.

Figure 2:
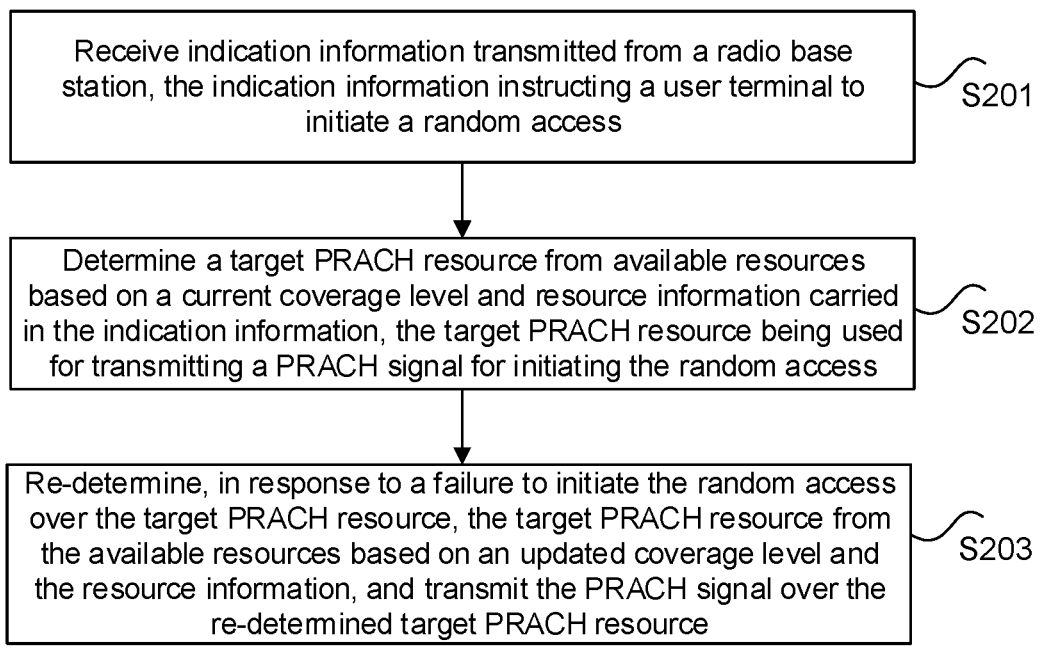
FIG. 2 is a flowchart illustrating a process of random access in a wireless communication system according to the present disclosure.

FIG. 2 is a flowchart illustrating a process of random access in a wireless communication system according to the present disclosure. As shown in FIG. 2, the process flow includes the following steps.

At step S201, indication information transmitted from a radio base station is received. The indication information instructs a user terminal to initiate a random access.

At step S202, a target PRACH resource is determined from available resources based on a current coverage level and resource information carried in the indication information. The target PRACH resource is used for transmitting a PRACH signal for initiating the random access. The current coverage level is a coverage level at which the random access is to be initiated currently. The available resources are resources allowable to be used at the current coverage level.

At step S203, in response to a failure to initiate the random access over the target PRACH resource, the target PRACH resource is re-determined from the available resources based on an updated coverage level and the resource information, and the PRACH signal is transmitted over the re-determined target PRACH resource.

With the above embodiments, indication information transmitted from a radio base station is received. The indication information instructs a user terminal to initiate a random access. A target PRACH resource is determined from available resources based on a current coverage level and resource information carried in the indication information. The target PRACH resource is used for transmitting a PRACH signal for initiating the random access. In response to a failure to initiate the random access over the target PRACH resource, the target PRACH resource is re-determined from the available resources based on an updated coverage level and the resource information, and the PRACH signal is transmitted over the re-determined target PRACH resource. In this way, it is possible to solve the technical problem in the related art associated with low success rate of random accesses initiated by radio base stations, thereby achieving a technical effect of an increased success rate of random accesses.

Optionally, the above steps may be performed by a user terminal, as a non-limiting example.

At the step S201, when the indication information transmitted from the radio base station is received, the indication information may include PDCCH order information. That is, a base station, or base station, may transmit the indication information via a PDCCH order. However, the present disclosure it not limited to this, and other types of base stations may use similar messages for transmission.

At the step S202, when the target PRACH resource is determined from available resources based on the current coverage level and the resource information carried in the indication information, the resource information may be mapped to the target PRACH resource from resources available at the current coverage level. The target PRACH resource may be determined based on a scheme corresponding to a system type of the radio base station.

When the wireless communication system is an eMTC system, the target PRACH resource can include a target time-frequency resource and a target codeword for transmitting the PRACH signal. The operation of determining a target PRACH resource from available resources based on a current coverage level and resource information carried in the indication information can include: determining the target time-frequency resource based on a number of time-frequency resources available at the current coverage level and a time-frequency resource index in the resource information; and/or determining the target codeword based on a start codeword and an end codeword of preambles at the current coverage level and a preamble index in the resource information.

Optionally, the operation of determining the target time-frequency resource based on the number of time-frequency resources available at the current coverage level and the time-frequency resource index in the resource information can include: calculating a first index, ID2, based on the number, Num1, of the available time-frequency resources and the time-frequency resource index, ID1, in the resource information according to a predetermined equation of ID2=

(ID1−K1)mod(Num1)+K2 or ID2=(ID1)mod(Num1)+K3, where K1, K2 and K3 are constants; and determining a time-frequency resource corresponding to ID2 as the target time-frequency resource.

The above "mod" represents a modulo operation.

The operation of determining the target codeword based on the start codeword and the end codeword of the preambles at the current coverage level and the preamble index in the resource information can include: calculating a second index, ID6, based on an index, ID3, of the start codeword, an index, ID4, of the end codeword and the preamble index, ID5, as ID6=ID3+(ID5)mod(ID4−ID3+1), or calculating the second index ID6 based on the index ID3 of the start codeword, the index ID4 of the end codeword and a start codeword index, ID9, corresponding to a coverage level indicated in the indication information, as ID6=ID3+(ID5−ID9)mod(ID4−ID3+1); and determining a codeword corresponding to ID6 as the target codeword.

When the wireless communication system is a NB-IoT system, the target PRACH resource can include a target sub-carrier for transmitting the PRACH signal, and the operation of mapping the resource information to the target PRACH resource from resources available at the current coverage level can include: determining the target sub-carrier based on a number of sub-carriers and an index of a start sub-carrier at the current coverage level and a sub-carrier index or offset in the resource information.

Optionally, the operation determining the target sub-carrier based on the number of sub-carriers and the index of the start sub-carrier at the current coverage level and the sub-carrier index or offset in the resource information can include: calculating a third index, ID8, based on the number, Num2, of sub-carriers and the index, ID7, of the start sub-carrier at the current coverage level and the sub-carrier offset, Num3, in the resource information, as ID8=ID7+(Num3)mod(Num2), or calculating the third index, ID8, based on the number Num2 of sub-carriers and the index ID7 of the start sub-carrier at the current coverage level, the sub-carrier index Num3 in the resource information and a start sub-carrier index, ID10, corresponding to a coverage level indicated in the indication information, as ID8=ID7+(Num3−ID10)mod(Num2); and determining the sub-carrier corresponding to ID8 as the target sub-carrier.

At the step S203, the failure to initiate the random access over the target PRACH resource may be determined by: obtaining a number of failures to initiate the random access; and determining the failure to initiate the random access over the target PRACH resource when the number of failures reaches a predetermined value that is a maximum number of transmissions of the PRACH signal allowable at the current coverage level.

It is to be noted that after obtaining the number of failures to initiate the random access, the PRACH signal may be retransmitted over the target PRACH resource when the number of failures is smaller than the predetermined value, until the number of failures reaches the predetermined value. The updated coverage level is one level higher than the coverage level before updating.

Figure 3:
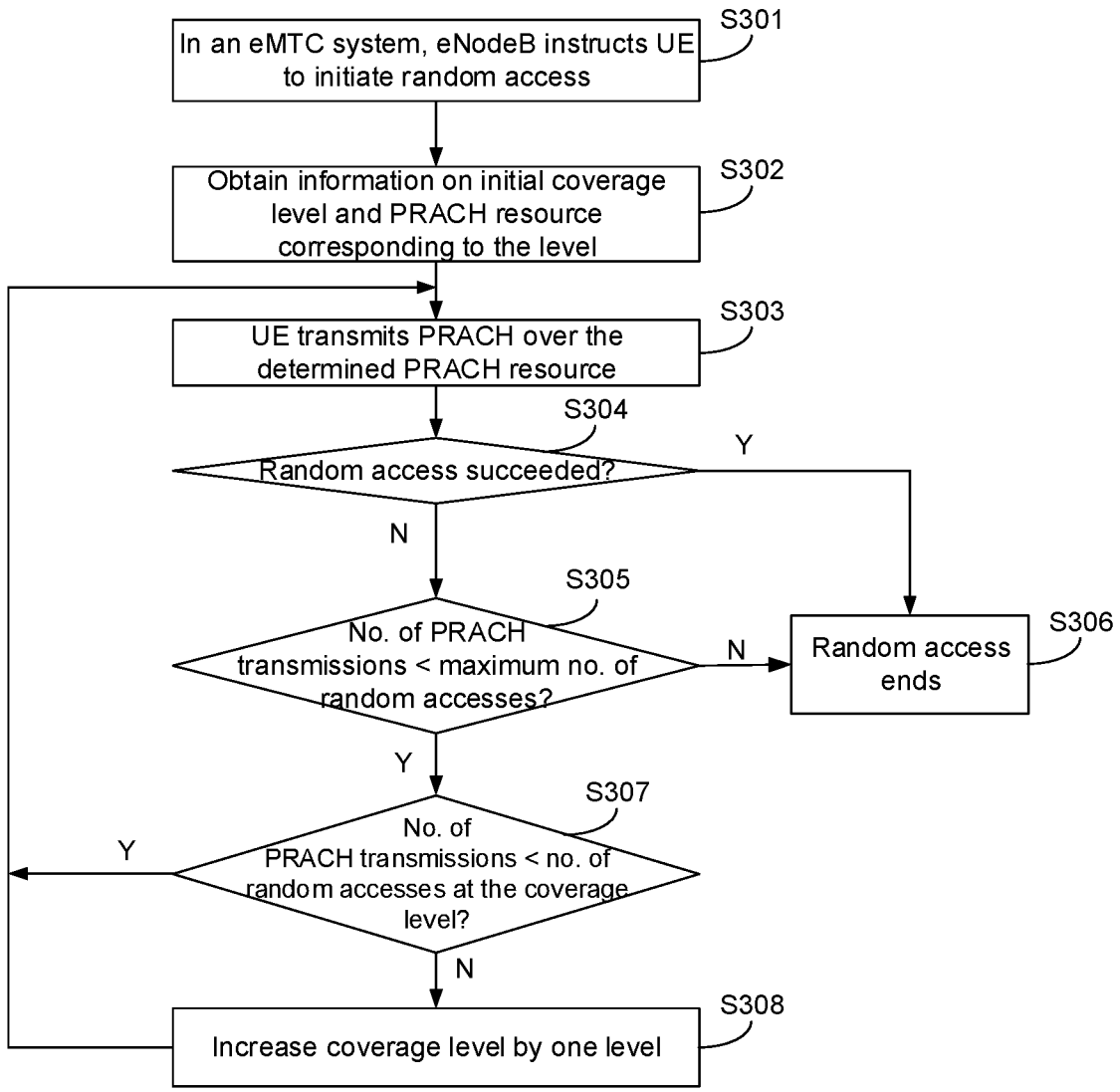
FIG. 3 is a flowchart illustrating an alternative process of random access in a wireless communication system according to the present disclosure
Figure 4:
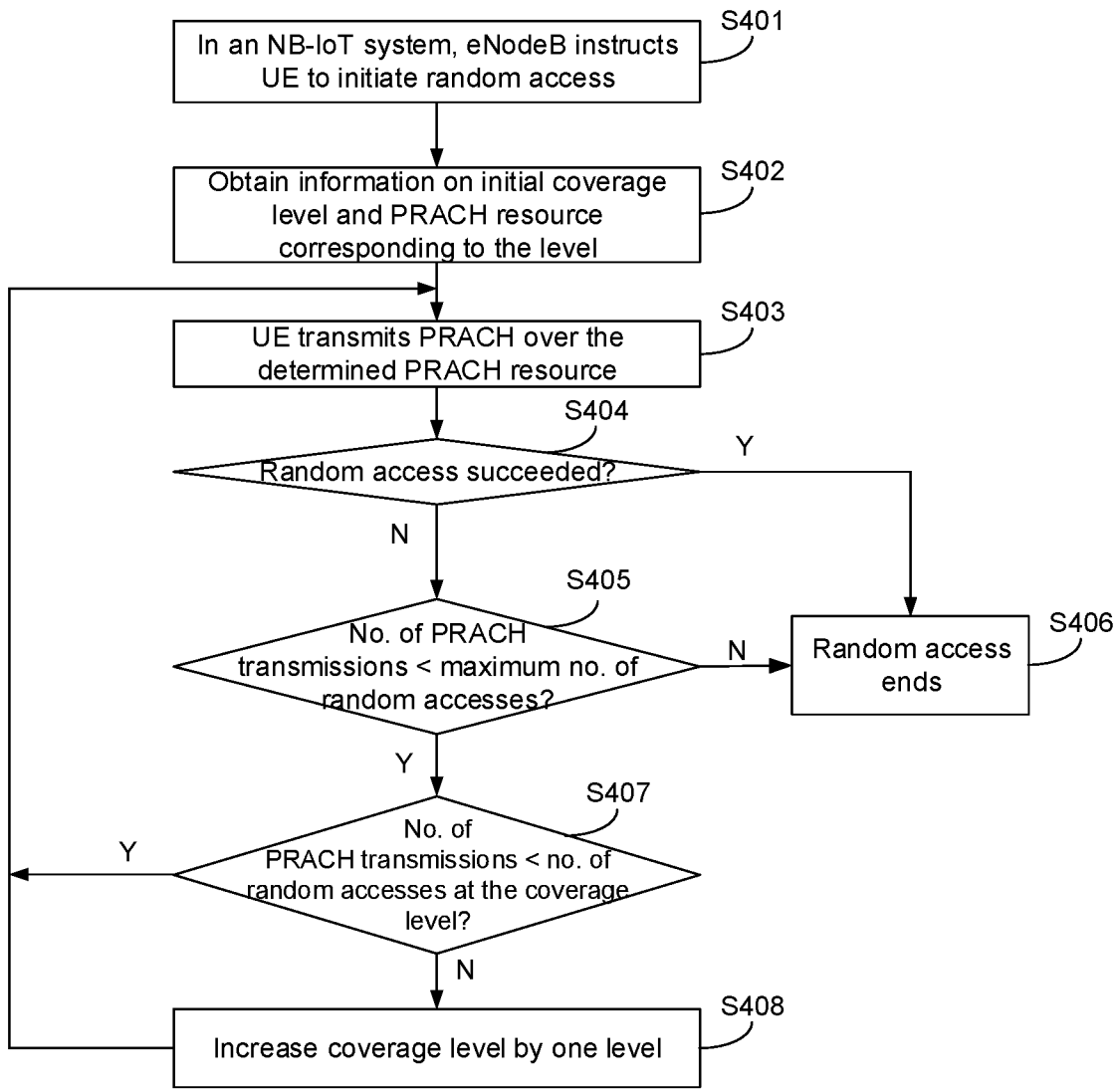
FIG. 4 is a flowchart illustrating an alternative process of random access in a wireless communication system according to the present disclosure.

In the following, the embodiment of the present disclosure will be described in detail with reference to various implementations shown in FIGS. 3 and 4.

Implementation 1

It is to be noted that an eMTC FDD system is configured with four coverage levels, CEL0, CEL1, CEL2 and CEL3, among which CEL0 is the lowest coverage level. PRACH resource information for the four coverage levels is shown in Table 2.

TABLE 2

| Coverage level | PRACH config. index | PRACH start subframe period | PRACH frequency-domain offset | Preamble codeword | Threshold for no. of random accesses (with a total number of 20) |
|---|---|---|---|---|---|
| CEL0 | 12 | 2 | 0 | 0-11 | 3 |
| CEL1 | 9 | 4 | 0 | 12-23 | 3 |
| CEL2 | 6 | 8 | 0 | 24-35 | 3 |
| CEL3 | 3 | 16 | 0 | 36-37 | 3 |

According to the 36.211 specification, the PRACH time-domain resources (radio frame numbers and subframe numbers) corresponding to the above PRACH configuration indices are shown in Table 3.

TABLE 3

| PRACH config. index | Radio frame No. | Subframe No. |
|---|---|---|
| 3 | Any | 1 |
| 6 | Any | 1, 6 |
| 9 | Any | 1, 4, 7 |
| 12 | Any | 0, 2, 4, 6, 8 |

At step S301, in an eMTC system, an base station instructs a UE to initiate a random access (e.g., by transmitting a PDCCH order). The indicated PRACH resource information includes an initial coverage level and a subcarrier indication of NPRACH (i.e., subcarrier index). In the PDCCH order transmitted from the base station, the indicated PRACH information is shown in Table 4.

TABLE 4

| eMTC | Description | Value |
|---|---|---|
| Starting CE Level | Coverage level at which UE transmits PRACH initially, i.e., UE initiates random access over a PRACH resource set corresponding to the coverage level initially | CEL1 |
| PRACH Mask Index | Time-frequency resource index for UE to transmit PRACH | 3 |
| Preamble Index | Preamble code to be used by UE for PRACH | 15 |

At step S302, the UE receives the PDCCH order, and obtains information on the initial coverage level and obtains a PRACH resource corresponding to the level, including a time-domain location, a frequency-domain location and a preamble codeword. The number of available PRACH time-frequency resources is NPRACH.

For example, the UE obtains time-frequency resource information of a PRACH resource set and a number of repetitions based on the initial coverage level. The UE can calculate a PRACH sub-carrier ID to be used based on the subcarrier indication of NPRACH and the number of PRACH sub-carriers available at the initial coverage level.

At step S303, the UE transmits PRACH over the determined PRACH resource.

If the PRACH Mask Index (i.e., time-frequency resource index) transmitted from the base station is within a range of 1-10, the UE can calculate/determine a UE Mask Index (i.e., a target time-frequency resource index) to be used based on the PRACH Mask Index and the number of PRACH time-frequency resources (NPRACH), by means of mod operation:

UE Mask Index=(PRACH Mask Index−1) mod (NPRACH)+1, or

UE Mask Index=(PRACH Mask Index) mod (NPRACH)+1.

The number of PRACH time-frequency resources can be obtained from PRACH resource configuration according to the 36.211 specification.

The definitions according to the 36.321 specification apply when the PRACH Mask Index field has other values.

The UE can calculate the Preamble ID (i.e., target sub-carrier index) to be used based on the Preamble Index (code index) transmitted from the base station and the number of preamble codewords (NPreamble):

Preamble ID=(firstPreamble-r13)+(Preamble Index) mod (NPreamble),

NPreamble=(lastPreamble-r13)−(firstPreamble-r13)+1, where "firstPreamble-r13" is an element defined in the 36.331 specification, which indicates a start preamble codeword at the current coverage level, and "lastPreamble-r13" is an element defined in the 36.331 specification, which indicates the last preamble codeword used for the current coverage level.

The UE transmits the PRACH based on the PRACH and preamble code as determined above.

At step S304, it is determined whether the random access has succeeded. If so, the method proceeds with step S306; otherwise the method proceeds with step S305.

At step S305, if the initiated random access process has failed, PRACH is retransmitted over the determined PRACH resource. It is determined whether the number of PRACH transmissions at the initial coverage level is smaller than a maximum number of random accesses. If so, the method proceeds with step S307; otherwise the method proceeds with step S306.

For example, the UE receives the PDCCH order, obtains the initial coverage level of CEL1 and the PRACH resource corresponding to CEL1. The PRACH configuration index is 9, i.e., the preamble code is to be transmitted in Subframes 1, 4 and 7 in each radio frame. The number, NPRACH, of PRACH resources available in this configuration is 3. The start subframe period for PRACH is 4 subframes. The start PRB of PRACH in the frequency domain is PRB=0. The number of preamble codes is 12, ranging from 12 to 23. The number of random accesses initiated at CEL1 is min(3, 20)=3.

The UE calculates the UE Mask Index to be used based on the PRACH Mask Index indicated in the PDCCH order: UE Mask Index=(PRACH Mask Index−1) mod NPRACH+1=(3−1) mod 3+1=3. According to the 36.321 and 36.211 specifications, the preamble code is transmitted in Subframe 7 of each radio frame. Since the start subframe period for PRACH is 4 subframes, the UE transmits the preamble code in the subframe satisfying $$\left(sf + \left\lfloor \frac{ns}{2} \right\rfloor\right) \bmod 40 = 7,$$

where sf is a radio frame number and ns is a slot number. The UE calculates the UE Mask Index to be used based on the Preamble Index indicated in the PDCCH order: UE Mask Index=12+15 mod 12=15. The UE transmits the preamble code 15 over the PRACH resource having PRB=0 in the determined subframe. If the initiated random access process fails and the number of random accesses initiated at CEL0 is smaller than 3, the preamble code 15 is retransmitted over the PRACH resource having PRB=0 in the subframe satisfying $$\left(sf + \left\lfloor \frac{ns}{2} \right\rfloor\right) \bmod 40 = 7.$$

At step S306, the random access process ends.

At step S307, it is determined whether the number of PRACH transmissions at the initial coverage level is smaller than the number of random accesses for this coverage level. If so, the method proceeds with step S303; otherwise the method proceeds with step S308.

At step 308, if the number of PRACH transmissions at the current coverage level is equal to max(NumPreambleAttemptCE-r13) (i.e., the number of random accesses for the current coverage level) and smaller than num(RepetitionsPerPreambleAttempt-r13) (i.e., the maximum number of random accesses), the coverage level is increased by one level and the step S303 is performed again.

The PRACH resource corresponding to the level is obtained, including a time-domain location, a frequency-domain location and a preamble codeword.

The UE obtains time-frequency resource information of a PRACH resource set and a number of repetitions based on the current coverage level. The UE can calculate a PRACH sub-carrier ID to be used based on the subcarrier indication of NPRACH and the number of PRACH sub-carriers available at the current coverage level.

The UE calculates the PRACH UE Mask Index and Preamble ID to be used at the new coverage level and transmits PRACH over the determined PRACH resource.

For example, if the number of random accesses initiated at CEL1 is 3 (which has not reached the total number threshold of 20), the UE increases the coverage level to CEL2 and obtains the PRACH resource corresponding to the level. The PRACH configuration index is 6, i.e., the preamble code is to be transmitted in Subframes 1 and 6 in each radio frame. The number, Nprach, of PRACH resources available in this configuration is 2. The start subframe period for PRACH is 8 subframes. The start PRB of PRACH in the frequency domain is PRB=0. The number of preamble codes is 12, ranging from 24 to 35. The number of random accesses initiated at CEL2 is min(3, 20−3)=3.

The UE calculates the UE Mask Index to be used based on the PRACH Mask Index indicated in the PDCCH order: UE Mask Index=(3−1) mod 2+1=1. According to the 36.321 and 36.211 specifications, the preamble code is transmitted in Subframe 1 of each radio frame. Since the start subframe period for PRACH is 8 subframes, the UE transmits the preamble code in the $$\left(sf + \left\lfloor \frac{ns}{2} \right\rfloor\right) \bmod 80 = 1,$$

subframe satisfying where sf is a radio frame number and ns is a slot number. The UE calculates the preamble index (i.e., Preamble ID) to be used based on the Preamble Index indicated in the PDCCH order: 24+15 mod 12=27. The UE transmits the preamble code 27 over the PRACH resource having PRB=0 in the determined subframe. The above steps are repeated until the random access succeeds or until the maximum number of repetitions min(3+3+3,20)=9 is reached.

Alternatively, the UE receives the PDCCH order, obtains the initial coverage level of CEL1 and the PRACH resource corresponding to CEL1. The PRACH configuration index is 9, i.e., the preamble code is to be transmitted in Subframes 1, 4 and 7 in each radio frame. The number, Nprach, of PRACH resources available in this configuration is 3. The start subframe period for PRACH is 4 subframes. The start PRB of PRACH in the frequency domain is PRB=0. The number of preamble codes is 12, ranging from 12 to 23. The number of random accesses initiated at CEL1 is min(3, 20)=3. The UE calculates the mask index to be used based on the PRACH Mask Index indicated in the PDCCH order: mask index=PRACH Mask Index mod Nprach+1=3 mod 3+1=1. According to the 36.321 and 36.211 specifications, mask index=3, i.e., the preamble code is transmitted in Subframe 7 of each radio frame. Since the start subframe period for PRACH is 4 subframes, the UE transmits the preamble code in the subframe satisfying $$\left(sf + \left\lfloor \frac{ns}{2} \right\rfloor\right) \mod 40 = 7,$$

where sf is a radio frame number and ns is a slot number.

The UE calculates the preamble index to be used based on the Preamble Index indicated in the PDCCH order: preamble index=12+Preamble Index mod 12=12+15 mod 12=15. The UE transmits the preamble code 15 over the PRACH resource having PRB=0 in the determined subframe. If the initiated random access process fails and the number of random accesses initiated at CEL0 is smaller than 3, the preamble code 15 is retransmitted over the PRACH resource having PRB=0 in the subframe satisfying $$\left(sf + \left\lfloor \frac{ns}{2} \right\rfloor\right) \mod 40 = 7.$$

If the number of random accesses initiated at CEL1 is 3 (which has not reached the total number threshold of 20), the UE increases the coverage level to CEL2 and obtains the PRACH resource corresponding to the level. The PRACH configuration index is 6, i.e., the preamble code is to be transmitted in Subframes 1 and 6 in each radio frame. The number, NPRACH, of PRACH resources available in this configuration is 2. The start subframe period for PRACH is 8 subframes. The start PRB of PRACH in the frequency domain is PRB=0. The number of preamble codes is 12, ranging from 24 to 35. The number of random accesses initiated at CEL2 is min(3, 20-3)=3.

The UE calculates the mask index to be used based on the PRACH Mask Index indicated in the PDCCH order: mask index=(PRACH Mask Index-1) mod NPRACH+1=(3-1) mod 2+1=1. According to the 36.321 and 36.211 specifications, mask index=1, i.e., the preamble code is transmitted in Subframe 1 of each radio frame.

Since the start subframe period for PRACH is 8 subframes, the UE transmits the preamble code in the subframe satisfying $$\left(sf + \left\lfloor \frac{ns}{2} \right\rfloor\right) \mod 80 = 1,$$

where sf is a radio frame number and ns is a slot number.

The UE calculates the preamble index to be used based on the Preamble Index indicated in the PDCCH order: preamble index=24+Preamble Index mod 12=24+15 mod 12=27. The UE transmits the preamble code 27 over the PRACH resource having PRB=0 in the determined subframe. The above steps are repeated until the random access succeeds or until the maximum number of repetitions min(3+3+3,20)=9 is reached.

Implementation 2

It is to be noted that an NB-IoT system is configured with three coverage levels, CEL0, CEL1 and CEL2, among which CEL0 is the lowest coverage level. PRACH resource information for the three coverage levels is shown in Table 5.

TABLE 5

| Coverage level | PRACH period | PRACH start subframe offset | PRACH sub-carrier | Threshold for no. of random accesses (with a total number of 20) |
|---|---|---|---|---|
| CEL0 | 640 ms | 8 ms | 0-11 | 3 |
| CEL1 | 640 ms | 64 ms | 12-23 | 3 |
| CEL2 | 640 ms | 256 ms | 24-35 | 3 |

At step S401, in an NB-IoT system, an base station transmits a PDCCH order indicating PRACH information as shown in Table 6, including a "Starting number of NPRACH repetitions" field and a "Subcarrier indication of NPRACH" field.

TABLE 6

| | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |

At step S402, the UE receives the PDCCH order, and obtains information on the initial coverage level and obtains a PRACH resource corresponding to the level, including a time-domain location and a frequency-domain location. Here, the frequency-domain location can be determined based on two parameters: nprach-SubcarrierOffset-r13 (an index of the first subcarrier allocated to PRACH) and nprach-NumSubcarriers-r13.

For example, the initial coverage level of CEL0 and the PRACH resource corresponding to CEL0 can be obtained. Its period is 640 ms, the start subframe offset is 8 and the number of sub-carriers is 12, ranging from 0 to 11. The number of random accesses initiated at CEL0 is min(3, 20)=3. The UE can calculate the sub-carrier ID to be used at CEL0 based on the indicated Subcarrier indication of NPRACH. The calculation can include but not limited to:

PRACH Sub-carrier ID=nprach-SubcarrierOffset-r13+ Subcarrier indication of NPRACH mod nprach-NumSub-carriers-r13=0+6 mod 12=6.

Ata step S403, when the end subframe of the PDCCH order is n, the UE transmits PRACH over the determined PRACH resource, starting from the subframe having an index of n+9.

For example, the UE transmits a PRACH signal, starting from a subframe satisfying $$\left(sf + \left\lfloor \frac{ns}{2} \right\rfloor\right) \bmod 640 = 8,$$

using a sub-carrier ID of 6, where sf is a radio frame number and ns is a slot number. If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \bmod 640 = 8,$$

using a sub-carrier ID of 6.

At step S404, it is determined whether the random access has succeeded. If so, the method proceeds with step S406; otherwise the method proceeds with step S405.

If the number of random accesses initiated at CEL0 is 3 (which has not reached the total number threshold of 20), the UE increases the coverage level to CEL1 and obtains the PRACH resource corresponding to the level. Its period is 640 ms, the start subframe offset is 64 and the number of sub-carriers is 12, ranging from 12 to 23. The number of random accesses initiated at CEL1 is min(3, 20−3)=3.

At step S405, if the initiated random access process has failed, PRACH is retransmitted over the determined PRACH resource. It is determined whether the number of PRACH transmissions at the initial coverage level is smaller than a maximum number of random accesses. If so, the method proceeds with step S407; otherwise the method proceeds with step S406.

At step S406, the random access process ends.

At step S407, it is determined whether the number of PRACH transmissions at the initial coverage level is smaller than the number of random accesses for this coverage level. If so, the method proceeds with step S403; otherwise the method proceeds with step S408.

At step 408, if the number of PRACH transmissions at the current coverage level is equal to max(NumPreambleAttemptCE-r13) (i.e., the number of random accesses for the current coverage level) and smaller than num(RepetitionsPerPreambleAttempt-r13) (i.e., the maximum number of random accesses), the coverage level is increased by one level, the PRACH resource corresponding to the level is obtained, including a time-domain location, a frequency-domain location and a number of repetitions, and the step S403 is performed again.

The UE calculates the PRACH sub-carrier ID to be used at the new coverage level.

The UE transmits PRACH over the re-determined PRACH resource.

For example, the UE can calculate the sub-carrier ID to be used at CELL based on the indicated Subcarrier indication of NPRACH. The calculation can include but not limited to: PRACH sub-carrier ID=12+6 mod 12=18. The UE retransmits the PRACH signal, starting from a subframe satisfying $$\left(sf + \left\lfloor \frac{ns}{2} \right\rfloor\right) \bmod 640 = 64,$$

using a sub-carrier ID of 18.

The above steps are repeated until the random access succeeds or until the maximum number of repetitions min (3+3+3,20)=9 is reached.

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present disclosure, in essence or in terms of parts contributing to the prior art, can be embodied in the form of a software product, which is stored in a storage medium (e.g., ROM/RAM, disc, CD-ROM) and includes a number of instructions for enabling a terminal device (which may be a mobile phone, a computer, a server, or a network device, etc.) to perform the method described in the various embodiments of the present disclosure.

Implementation 3

It is to be noted that an NB-IoT system is configured with three coverage levels, CEL0, CEL1 and CEL2, among which CEL0 is the lowest coverage level. PRACH resource information for the three coverage levels is shown in Table 7.

TABLE 7

| Coverage level | PRACH period | PRACH start subframe offset | PRACH sub-carrier | Threshold for no. of random accesses (with a total number of 20) |
|---|---|---|---|---|
| CEL0 | 640 ms | 8 ms | 0-11 | 3 |
| CEL1 | 640 ms | 64 ms | 12-23 | 3 |
| CEL2 | 640 ms | 256 ms | 24-35 | 3 |

At step S401, in an NB-IoT system, an base station transmits a PDCCH order indicating PRACH information as shown in Table 8, including a "Starting number of NPRACH repetitions" field and a "Subcarrier indication of NPRACH" field.

TABLE 8

| | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |

At step S402, the UE receives the PDCCH order, and obtains information on the initial coverage level and obtains a PRACH resource corresponding to the level, including a time-domain location and a frequency-domain location. Here, the frequency-domain location can be determined based on two parameters: nprach-SubcarrierOffset-r13 (PRACH start sub-carrier) and nprach-NumSubcarriers-r13.

For example, the initial coverage level of CEL0 and the PRACH resource corresponding to CEL0 can be obtained. Its period is 640 ms, the start subframe offset is 8 and the number of sub-carriers is 12, ranging from 0 to 11. The number of random accesses initiated at CEL0 is min(3, 20)=3. The UE can calculate the sub-carrier ID to be used at CEL0 based on the indicated Subcarrier indication of NPRACH. The calculation can include but not limited to:

PRACH Sub-carrier ID=nprach-SubcarrierOffset-r13+ (Subcarrier indication of NPRACH-nprach-SubcarrierOffset-r13) mod nprach-NumSubcarriers-r13=0+(6−0) mod 12=6.

Ata step S403, when the end subframe of the PDCCH order is n, the UE transmits PRACH over the determined PRACH resource, starting from the subframe having an index of n+9.

For example, the UE transmits a PRACH signal, starting from a subframe satisfying $$\left(sf + \left\lfloor \frac{ns}{2} \right\rfloor\right) \mod 640 = 8,$$

using a sub-carrier ID of 6, where sf is a radio frame number and ns is a slot number. If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \mod 640 = 8,$$

using a sub-carrier ID of 6.

At step S404, it is determined whether the random access has succeeded. If so, the method proceeds with step S406; otherwise the method proceeds with step S405.

If the number of random accesses initiated at CEL0 is 3 (which has not reached the total number threshold of 20), the UE increases the coverage level to CEL1 and obtains the PRACH resource corresponding to the level. Its period is 640 ms, the start subframe offset is 64 and the number of sub-carriers is 12, ranging from 12 to 23. The number of random accesses initiated at CEL1 is min(3, 20−3)=3.

At step S405, if the initiated random access process has failed, PRACH is retransmitted over the determined PRACH resource. It is determined whether the number of PRACH transmissions at the initial coverage level is smaller than a maximum number of random accesses. If so, the method proceeds with step S407; otherwise the method proceeds with step S406.

At step S406, the random access process ends.

At step S407, it is determined whether the number of PRACH transmissions at the initial coverage level is smaller than the number of random accesses for this coverage level. If so, the method proceeds with step S403; otherwise the method proceeds with step S408.

At step 408, if the number of PRACH transmissions at the current coverage level is equal to max(NumPreambleAttemptCE-r13) (i.e., the number of random accesses for the current coverage level) and smaller than num(RepetitionsPerPreambleAttempt-r13) (i.e., the maximum number of random accesses), the coverage level is increased by one level, the PRACH resource corresponding to the level is obtained, including a time-domain location, a frequency-domain location and a number of repetitions, and the step S403 is performed again.

The UE calculates the PRACH sub-carrier ID to be used at the new coverage level.

The UE transmits PRACH over the re-determined PRACH resource.

For example, the UE can calculate the sub-carrier ID to be used at CEL1 based on the indicated Subcarrier indication of NPRACH. The calculation can include but not limited to: PRACH sub-carrier ID=12+(6−0) mod 12=18. The UE retransmits the PRACH signal, starting from a subframe satisfying $$\left(sf + \left\lfloor \frac{ns}{2} \right\rfloor\right) \mod 640 = 64,$$

using a sub-carrier ID of 18.

The above steps are repeated until the random access succeeds or until the maximum number of repetitions min (3+3+3,20)=9 is reached.

After the multi-carrier enhancement technique has been introduced in NB-IoT Rel-14, it is allowed to initiate a random access in anchor carrier(s) and non-anchor carrier(s). PRACH carriers available for random access are configured at each coverage level. For a base station initiated random access process, in addition to the above PRACH resource information, the base station indicates a PRACH carrier for a terminal to initiate random access. When the coverage level needs to be increased after the terminal has failed to initiate the random access at the initial coverage level indicated by the base station, the PRACH carrier indicated by the base station may not be included in the set of PRACH resources for the higher level. In this case, the UE would not be able to initiate a random access or the UE transmits a PRACH signal over the PRACH resource indicated by the base station but the base station would not respond. In either case, the random access will fail, resulting in a reduced success rate of the base station initiated random accesses and loss of uplink synchronization of the terminal.

Optionally, the target PRACH resource further includes a target carrier for transmitting the PRACH signal. The operation of mapping the resource information to the target PRACH resource from resources available at the current coverage level includes: determining the target carrier based on a list of carriers at the current coverage level and a carrier index in the resource information.

Optionally, the operation of determining the target carrier based on the list of carriers at the current coverage level and the carrier index in the resource information includes: determining a list of target carriers at the current coverage level based on a list of non-anchor carriers configured by the system and PRACH resource configurations for different coverage levels on each carrier, wherein the list of non-anchor carriers stores first non-anchor carriers, a second non-anchor carrier in the list of target carriers is included in the list of non-anchor carriers, and each carrier in the list of target carriers has an index; calculating a fourth index, ID12, based on a number, Num4, of carriers in the list of target carriers and the carrier index, ID11, as ID12=(ID11)mod(Num4), wherein the carrier index ID 11 is an index for searching for the target carrier; and determining a carrier having the index of ID12 in the list of target carriers as the target carrier.

Each non-anchor carrier is configured by the system with PRACH resources corresponding to the respective coverage levels. According to the order in the list of non-anchor carriers configured by the system, the non-anchor carriers each configured with the PRACH resource for the current coverage level are organized, in their sequence in the list of non-anchor carriers, into the list of target carriers.

Optionally, when the carrier index ID 11 is not equal to a predetermined threshold, each of the first non-anchor carriers in the list of the non-anchor carriers has a carrier sequence number, an anchor carrier at the head of the list of target carriers has a carrier sequence number of 0, and the second non-anchor carrier has a same carrier sequence number as a carrier, from which the second non-anchor carrier originates, in the list of the non-anchor carriers.

Optionally, when the carrier index ID 11 is not equal to a predetermined threshold, an anchor carrier at the head of the list of target carriers has a carrier sequence number of 0, and the second non-anchor carrier has a carrier sequence number that is the same as the index of the second non-anchor carrier.

Optionally, when the carrier index ID 11 is not equal to a predetermined threshold, each of the first non-anchor carriers in the list of the non-anchor carriers has a carrier sequence number, an anchor carrier at the end of the list of target carriers has a carrier sequence number of 0, and the second non-anchor carrier has a same carrier sequence number as a carrier, from which the second non-anchor carrier originates, in the list of the non-anchor carriers.

Optionally, when the carrier index ID 11 is equal to a predetermined threshold, each of the first non-anchor carriers in the list of the non-anchor carriers has a carrier sequence number, and, in the list of target carriers, the second non-anchor carrier has a same carrier sequence number as a carrier, from which the second non-anchor carrier originates, in the list of the non-anchor carriers. The list of target carriers includes no anchor carrier.

Optionally, when the carrier index ID 11 is equal to a predetermined threshold, in the list of target carriers, the second non-anchor carrier has a carrier sequence number that is the same as the index of the second non-anchor carrier. The list of target carriers includes no anchor carrier.

Optionally, when the carrier index ID 11 is equal to a predetermined threshold, an anchor carrier is the target carrier. The predetermined threshold indicates the anchor carrier as the target carrier.

The operation of determining the target carrier based on the list of carriers at the current coverage level includes: determining a list, A, of available carriers at the current coverage level based on the list of non-anchor carriers configured by the system, {non-anchor carrier ID1, non-anchor carrier ID2, . . . }, and PRACH resource configurations for respective coverage levels on each carrier. The carriers in the list A are arranged in the order of {anchor carrier, non-anchor carrier n1, non-anchor carrier n2, . . . }. Indices 0, 1, 2, . . . are assigned to the carriers in the list A in that order. The anchor carrier has a carrier ID of 0. The carrier IDs of non-anchor carrier n1, non-anchor carrier n2, . . . are carrier IDs of the respective non-anchor carriers in the list of non-anchor carriers configured by the system, in the order that is the same as, or conforms to, the order in the list of non-anchor carriers configured by the system. The fourth index ID12 is calculated based on the number Num4 of carriers in the list A of carriers and the carrier index ID11, as ID12=(ID11)mod(Num4). A carrier having the index of ID in the list A of carriers is determined as the target carrier.

Alternatively, a list, A, of available carriers at the current coverage level can be determined based on the list of non-anchor carriers configured by the system, {non-anchor carrier ID1, non-anchor carrier ID2, . . . }, and PRACH resource configurations for respective coverage levels on each carrier. The carriers in the list A are arranged in the order of {anchor carrier, non-anchor carrier n1, non-anchor carrier n2, . . . }. Indices 0, 1, 2, . . . are assigned to the carriers in the list A in that order. The carrier IDs of the anchor carrier, non-anchor carrier n1, non-anchor carrier n2, . . . are their respective indices. The order of non-anchor carrier n1, non-anchor carrier n2, . . . is the same as the order in the list of non-anchor carriers configured by the system. The fourth index ID12 is calculated based on the number Num4 of carriers in the list A of carriers and the carrier index ID11, as ID12=(ID11)mod(Num4). A carrier having the index of ID12 in the list A of carriers is determined as the target carrier.

Alternatively, a list, A, of available carriers at the current coverage level can be determined based on the list of non-anchor carriers configured by the system, {non-anchor carrier ID1, non-anchor carrier ID2, . . . }, and PRACH resource configurations for respective coverage levels on each carrier. The carriers in the list A are arranged in the order of {non-anchor carrier n1, non-anchor carrier n2, . . . , anchor carrier}. Indices 0, 1, 2, . . . are assigned to the carriers in the list A in that order. The anchor carrier has a carrier ID of 0. The carrier IDs of non-anchor carrier n1, non-anchor carrier n2, . . . are carrier IDs of the respective non-anchor carriers in the list of non-anchor carriers configured by the system, in the order that is the same as, or conforms to, the order in the list of non-anchor carriers configured by the system. The fourth index ID12 is calculated based on the number Num4 of carriers in the list A of carriers and the carrier index ID11, as ID12=(ID11)mod(Num4). A carrier having the index of ID12 in the list A of carriers is determined as the target carrier.

Alternatively, if the carrier index ID11 is a particular value, the anchor carrier is determined as the target subcarrier. If the carrier index ID11 is not the particular value, a list, A, of available carriers at the current coverage level can be determined based on the list of non-anchor carriers configured by the system, {non-anchor carrier ID1, non-anchor carrier ID2, . . . }, and PRACH resource configurations for respective coverage levels on each carrier. The carriers in the list A are arranged in the order of {non-anchor carrier n1, non-anchor carrier n2, . . . }. Indices 0, 1, 2, . . . are assigned to the carriers in the list A in that order. The anchor carrier has a carrier ID of 0. The carrier IDs of non-anchor carrier n1, non-anchor carrier n2, . . . are carrier IDs of the respective non-anchor carriers in the list of non-anchor carriers configured by the system, in the order that is the same as, or conforms to, the order in the list of non-anchor carriers configured by the system. The fourth index ID12 is calculated based on the number Num4 of carriers in the list A of carriers and the carrier index ID11, as ID12=(ID11)mod(Num4). A carrier having the index of ID12 in the list A of carriers is determined as the target carrier.

Alternatively, if the carrier index ID11 is a particular value, the anchor carrier is determined as the target subcarrier. If the carrier index ID11 is not the particular value, a list, A, of available carriers at the current coverage level can be determined based on the list of non-anchor carriers configured by the system, {non-anchor carrier ID1, non-anchor carrier ID2, . . . }, and PRACH resource configurations for respective coverage levels on each carrier. The carriers in the list A are arranged in the order of {anchor carrier, non-anchor carrier n1, non-anchor carrier n2, . . . }. Indices 0, 1, 2, . . . are assigned to the carriers in the list A in that order. The carrier IDs of non-anchor carrier n1, non-anchor carrier n2, . . . are their respective indices. The order of non-anchor carrier n1, non-anchor carrier n2, . . . is the same as the order in the list of non-anchor carriers configured by the system. The fourth index ID12 is calculated based on the number Num4 of carriers in the list A of carriers and the carrier index ID11, as ID12=(ID11)mod (Num4). A carrier having the index of ID12 in the list A of carriers is determined as the target carrier.

Table 9 shows PRACH information indicated in a PDCCH order according to NB-IoT Rel-14 standard protocol.

TABLE 9

| NB-IoT | Description |
|---|---|
| Starting number of NPRACH repetitions | Coverage level at which UE transmits PRACH initially, i.e., UE initiates random access over a PRACH resource set corresponding to the coverage level initially |
| Subcarrier indication of NPRACH | Frequency-domain sub-carrier ID (NB-IoT) for UE to transmit PRACH |
| PRACH carrier Index | Carrier index for UE to transmit PRACH initially |

In the NB-IoT system, for a Rel-13 terminal, it transmits a PRACH signal on an anchor carrier and determines the sub-carrier for transmission of PRACH. For a Rel-14 terminal, it determines the PRACH carrier for transmission of a PRACH signal at the current coverage level based on the "PRACH carrier Index" field indicated by the base station, in accordance with the following non-limiting schemes.

Scheme 1:

1) All PRACH carriers available for transmitting the PRACH signal at the current coverage level are determined. If there is an anchor carrier, it will be numbered as 0 and non-anchor carriers will be numbered sequentially, starting from 1, according to their orders in a list of non-anchor carriers in a broadcast message. If there is no anchor carrier, non-anchor carriers will be numbered sequentially, starting from 0, according to their orders in a list of non-anchor carriers in a broadcast message. The numbers are denoted as index1, and the maximum number+1 is the number, Nprach_carrier, of PRACH carriers available for transmitting the PRACH signal at the current coverage level. The number is denoted as index1, and the maximum number is the number, Nprach_carrier, of PRACH carriers available for transmitting the PRACH signal at the current coverage level.

2) The PRACH carrier to be used at the current coverage level is determined as: index2=index1 mod Nprach_carrier.

3) The PRACH carrier having the value of index2 in index1 is determined as the PRACH carrier to be used by the terminal for transmitting the PRACH signal.

Scheme 2:

1) All PRACH carriers available for transmitting the PRACH signal at the current coverage level are determined. Non-anchor carriers are numbered sequentially, starting from 0, according to their orders in a list of non-anchor carriers in a broadcast message. The maximum number is Nnon-anchor. If there is an anchor carrier, it will be numbered as Nnon-anchor+1. The numbers are denoted as index1, and the maximum number+1 is the number, Nprach_carrier, of PRACH carriers available for transmitting the PRACH signal at the current coverage level.

2) The PRACH carrier to be used at the current coverage level is determined as: index2=index1 mod Nprach_carrier.

3) The PRACH carrier having the value of index2 in index1 is determined as the PRACH carrier to be used by the terminal for transmitting the PRACH signal.

Scheme 3:

1) If PRACH carrier Index indicated by the system is a particular value (e.g., 0 or 15), it indicates that the PRACH signal is to be transmitted on an anchor carrier. The terminal transmits the PRACH signal only on the anchor carrier.

2) If PRACH carrier Index indicated by the system is not the particular value, all non-anchor carriers available for transmitting the PRACH signal at the current coverage level are determined. Non-anchor carriers are numbered sequentially, starting from 0, according to their orders in a list of non-anchor carriers in a broadcast message. The numbers are denoted as index1, and the maximum number+1 is the number, Nprach_carrier, of PRACH carriers available for transmitting the PRACH signal at the current coverage level.

3) The PRACH carrier to be used at the current coverage level is determined as: index2=index1 mod Nprach_carrier.

4) The PRACH carrier having the value of index2 in index1 is determined as the PRACH carrier to be used by the terminal for transmitting the PRACH signal.

Scheme 4:

1) If PRACH carrier Index indicated by the system is a particular value of 0, it indicates that the PRACH signal is to be transmitted on an anchor carrier. The terminal transmits the PRACH signal only on the anchor carrier.

2) If PRACH carrier Index indicated by the system is not the particular value, all non-anchor carriers available for transmitting the PRACH signal at the current coverage level are determined. The anchor carrier is numbered as 0. The non-anchor carriers are numbered sequentially, starting from 1, according to their orders in a list of non-anchor carriers in a broadcast message. The numbers are denoted as index1, and the maximum number is the number, Nprach_carrier, of PRACH carriers available for transmitting the PRACH signal at the current coverage level.

3) The PRACH carrier to be used at the current coverage level is determined as: index2=1+index1 mod Nprach_carrier.

4) The PRACH carrier having the value of index2 in index1 is determined as the PRACH carrier to be used by the terminal for transmitting the PRACH signal.

An optional embodiment is described below.

An NB-IoT system is configured with three coverage levels, CEL0, CEL1 and CEL2, among which CEL0 is the lowest coverage level. An NB-IoT cell is configured with one anchor carrier and three non-anchor carriers. The PRACH resource information for these five carriers is shown in Table 10, which gives PRACH information configured by means of NB-IoT system broadcast.

TABLE 10

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL0 | 640 ms | 8 ms | 0-11 | 3 |
| | CEL1 | 640 ms | 64 ms | 12-23 | 3 |
| | CEL2 | 640 ms | 256 ms | 24-35 | 3 |
| Non-anchor carrier 1 | CEL0 | 640 ms | 8 ms | 0-11 | 3 |
| | CEL1 | 640 ms | 64 ms | 12-23 | 3 |
| | CEL2 | 640 ms | 256 ms | 24-35 | 3 |
| Non-anchor carrier 2 | CEL0 | 640 ms | 8 ms | 0-11 | 3 |
| | CEL1 | 640 ms | 64 ms | 12-23 | 3 |
| Non-anchor carrier 3 | CEL0 | 640 ms | 8 ms | 0-11 | 3 |

An base station transmits a PDCCH order indicating PRACH information as shown in Table 11.

TABLE 11

| | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |
| PRACH carrier Index | Carrier index for UE to transmit PRACH initially | 3 |

A Rel-14 UE receives the PDCCH order, obtains an initial coverage level of CEL0 and PRACH resource information corresponding to CEL0. The PRACH resource information corresponding to CEL0 is shown in Table 12.

TABLE 12

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL0 | 640 ms | 8 ms | 0-11 | 3 |
| Non-anchor carrier 1 | CEL0 | 640 ms | 8 ms | 0-11 | 3 |
| Non-anchor carrier 2 | CEL0 | 640 ms | 8 ms | 0-11 | 3 |
| Non-anchor carrier 3 | CEL0 | 640 ms | 8 ms | 0-11 | 3 |

The anchor carrier is numbered as 0. The non-anchor carriers are numbered, starting from 1, according to their orders in a list of carriers configured by system broadcast. The non-anchor carrier 1 is numbered as 1, the non-anchor carrier 2 is numbered as 2, and the non-anchor carrier 3 is numbered as 3. A list of the numbers 0-3 is denoted as index1, i.e., index1=[0,1,2,3], corresponding to {anchor carrier, non-anchor carrier 1, non-anchor carrier 2, non-anchor carrier 3}. Meanwhile, it knows that the number of PRACH carriers at CEL0 is 4.

The UE determines the PRACH carrier index to be used at CEL0 based on the indicated PRACH carrier Index: index2=PRACH carrier Index mod 4=3 mod 4=3.

The carrier having an index of 3 in index1, i.e., the non-anchor carrier 3, is determined as the PRACH carrier to be used by the UE for transmitting the PRACH signal.

On the non-anchor carrier 3, the UE calculates the sub-carrier ID to be used at CEL0 based on the indicated Subcarrier indication of NPRACH, according to, as a non-limiting example:

PRACH carrier ID=0+6 mod 12=6.

The UE transmits the PRACH signal, starting from a subframe satisfying $$\left(sf + \left\lfloor \frac{ns}{2} \right\rfloor\right) \mod 640 = 8,$$

using a sub-carrier ID of 6 on the non-anchor carrier 3, where sf is a radio frame number and ns is a slot number.

If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \mod 640 = 8,$$

using a sub-carrier ID of 6 on the non-anchor carrier 3.

If the number of random accesses initiated at CEL0 is 3 (which has not reached the total number threshold of 20), the UE increases the coverage level to CEL1 and obtains the PRACH resource corresponding to the level, as shown in Table 13.

TABLE 13

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL1 | 640 ms | 64 ms | 12-23 | 3 |
| Non-anchor carrier 1 | CEL1 | 640 ms | 64 ms | 12-23 | 3 |
| Non-anchor carrier 2 | CEL1 | 640 ms | 64 ms | 12-23 | 3 |

The anchor carrier is numbered as 0. The non-anchor carriers are numbered, starting from 1, according to their orders in a list of carriers configured by system broadcast. The non-anchor carrier 1 is numbered as 1 and the non-anchor carrier 2 is numbered as 2. A list of the numbers 0-2 is denoted as index1, i.e., index1=[0,1,2], corresponding to {anchor carrier, non-anchor carrier 1, non-anchor carrier 2}. Meanwhile, it knows that the number of PRACH carriers at CEL0 is 3.

The UE determines the PRACH carrier index to be used at CEL1 based on the indicated PRACH carrier Index: index2=PRACH carrier Index mod 3=3 mod 3=0.

The carrier having an index of 0 in index1, i.e., the anchor carrier, is determined as the PRACH carrier to be used by the UE for transmitting the PRACH signal.

On the anchor carrier, the UE calculates the sub-carrier ID to be used at CEL1 based on the indicated Subcarrier indication of NPRACH, according to, as a non-limiting example:

PRACH carrier ID=12+6 mod 12=18.

The UE retransmits the PRACH signal, starting from a subframe satisfying $$\left(sf + \left\lfloor \frac{ns}{2} \right\rfloor\right) \mod 640 = 8,$$

using a sub-carrier ID of 18 on the anchor carrier.

The above steps are repeated until the random access succeeds or until the maximum number of repetitions min (3+3+3,20)=9 is reached.

A further optional example is provided according to this embodiment.

An NB-IoT system is configured with three coverage levels, CEL0, CEL1 and CEL2, among which CEL0 is the lowest coverage level. An NB-IoT cell is configured with one anchor carrier and three non-anchor carriers. The PRACH resource information for these five carriers is shown in Table 14.

TABLE 14

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 1 | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 2 | CEL0 | 640 ms | 8 ms | 0-11 | 3 |
|  | CEL1 | 640 ms | 64 ms | 12-23 | 3 |
| Non-anchor carrier 3 | CEL0 | 640 ms | 8 ms | 0-11 | 3 |

An base station transmits a PDCCH order indicating PRACH information as shown in Table 15. Table 15 shows the PRACH information indicated in the PDCCH order transmitted in NB-IoT.

TABLE 15

|  | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |
| PRACH carrier Index | Carrier index for UE to transmit PRACH initially | 3 |

A Rel-14 UE receives the PDCCH order. The indicated PRACH carrier Index is not a particular value (assumed to be 0). Then, the UE obtains an initial coverage level of CEL0 and PRACH resource information for non-anchor carriers corresponding to CEL0. The PRACH resource information for non-anchor carriers corresponding to CEL0 is shown in Table 16.

TABLE 16

| Carrier ID | Coverage level | PRACH period | PRACH start subframe offset | PRACH sub-carrier | Threshold for no. of random accesses (with a total number of 20) |
|---|---|---|---|---|---|
| Non-anchor carrier 1 | CEL0 | 640 ms | 8 ms | 0-11 | 3 |
| Non-anchor carrier 2 | CEL0 | 640 ms | 8 ms | 0-11 | 3 |
| Non-anchor carrier 3 | CEL0 | 640 ms | 8 ms | 0-11 | 3 |

The non-anchor carriers are numbered, starting from 0, according to their orders in a list of carriers configured by system broadcast. The non-anchor carrier 1 is numbered as 0, the non-anchor carrier 2 is numbered as 1, and the non-anchor carrier 3 is numbered as 2. A list of the numbers 0-2 is denoted as index1, i.e., index1=[0,1,2], corresponding to {non-anchor carrier 1, non-anchor carrier 2, non-anchor carrier 3}. Meanwhile, it knows that the number of non-anchor PRACH carriers at CEL0 is 3.

The UE determines the non-anchor PRACH carrier index to be used at CEL0 based on the indicated PRACH carrier Index: index2=PRACH carrier Index mod 3=3 mod 3=0.

The carrier having an index of 0 in index1, i.e., the non-anchor carrier 1, is determined as the PRACH carrier to be used by the UE for transmitting the PRACH signal.

On the non-anchor carrier 1, the UE calculates the sub-carrier ID to be used at CEL0 based on the indicated Subcarrier indication of NPRACH, according to, as a non-limiting example:

PRACH carrier ID=0+6 mod 12=6.

The UE transmits the PRACH signal, starting from a subframe satisfying $$\left(sf + \left\lfloor \frac{ns}{2} \right\rfloor\right) \bmod 640 = 8,$$

using a sub-carrier ID of 6 on the non-anchor carrier 1, where sf is a radio frame number and ns is a slot number.

If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \bmod 640 = 8,$$

using a sub-carrier ID of 6 on the non-anchor carrier 1.

If the number of random accesses initiated at CEL0 is 3 (which has not reached the total number threshold of 20), the UE increases the coverage level to CEL1 and obtains the non-anchor PRACH resource corresponding to the level, as shown in Table 17.

TABLE 17

| Carrier ID | Coverage level | PRACH period | PRACH start subframe offset | PRACH sub-carrier | Threshold for no. of random accesses (with a total number of 20) |
|---|---|---|---|---|---|
| Non-anchor carrier 1 | CEL1 | 640 ms | 64 ms | 12-23 | 3 |
| Non-anchor carrier 2 | CEL1 | 640 ms | 64 ms | 12-23 | 3 |

The non-anchor carriers are numbered, starting from 0, according to their orders in a list of carriers configured by system broadcast. The non-anchor carrier 1 is numbered as 0 and the non-anchor carrier 2 is numbered as 1. A list of the numbers 0-1 is denoted as index1, i.e., index1=[0,1], corresponding to {non-anchor carrier 1, non-anchor carrier 2}. Meanwhile, it knows that the number of non-anchor PRACH carriers at CEL0 is 2.

The UE determines the PRACH carrier index to be used at CEL1 based on the indicated PRACH carrier Index: index2=PRACH carrier Index mod 2=3 mod 2=1.

The carrier having an index of 1 in index1, i.e., the non-anchor carrier 2, is determined as the PRACH carrier to be used by the UE for transmitting the PRACH signal.

On the non-anchor carrier 2, the UE calculates the sub-carrier ID to be used at CEL1 based on the indicated Subcarrier indication of NPRACH, according to, as a non-limiting example:

PRACH carrier ID=12+6 mod 12=18.

The UE retransmits the PRACH signal, starting from a subframe satisfying $$\left(sf + \left\lfloor \frac{ns}{2} \right\rfloor\right) \bmod 640 = 8,$$

using a sub-carrier ID of 18 on the non-anchor carrier 2.

The above steps are repeated until the random access succeeds or until the maximum number of repetitions min (3+3+3,20)=9 is reached.

A further optional example is provided according to the present disclosure.

An NB-IoT system is configured with three coverage levels, CEL0, CEL1 and CEL2, among which CEL0 is the lowest coverage level. An NB-IoT cell is configured with one anchor carrier and three non-anchor carriers. The PRACH resource information for these five carriers is shown in Table 18, which gives PRACH information configured by means of NB-IoT system broadcast.

TABLE 18

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 1 | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 2 | CEL0 | 640 ms | 8 ms | 0-11 | 3 |
|  | CEL1 | 640 ms | 64 ms | 12-23 | 3 |
| Non-anchor carrier 3 | CEL0 | 640 ms | 8 ms | 0-11 | 3 |

An base station transmits a PDCCH order indicating PRACH information as shown in Table 19. Table 19 shows the PRACH information indicated in the PDCCH order transmitted in NB-IoT.

TABLE 19

| | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |
| PRACH carrier Index | Carrier index for UE to transmit PRACH initially | 3 |

A Rel-14 UE receives the PDCCH order. The indicated PRACH carrier Index is not a particular value (assumed to be 0). Then, the UE obtains an initial coverage level of CEL0 and PRACH resource information for non-anchor carriers corresponding to CEL0. The PRACH resource information for non-anchor carriers corresponding to CEL0 is shown in Table 20.

TABLE 20

| Carrier ID | Coverage level | PRACH period | PRACH start subframe offset | PRACH sub-carrier | Threshold for no. of random accesses (with a total number of 20) |
|---|---|---|---|---|---|
| Non-anchor carrier 1 | CEL0 | 640 ms | 8 ms | 0-11 | 3 |
| Non-anchor carrier 2 | CEL0 | 640 ms | 8 ms | 0-11 | 3 |
| Non-anchor carrier 3 | CEL0 | 640 ms | 8 ms | 0-11 | 3 |

The anchor carrier is numbered as 0. The non-anchor carriers are numbered, starting from 1, according to their orders in a list of carriers configured by system broadcast. The non-anchor carrier 1 is numbered as 1, the non-anchor carrier 2 is numbered as 2, and the non-anchor carrier 3 is numbered as 3. A list of the numbers 0-3 is denoted as index1, i.e., index1=[0,1,2,3], corresponding to {anchor carrier, non-anchor carrier 1, non-anchor carrier 2, non-anchor carrier 3}. Meanwhile, it knows that the number of non-anchor PRACH carriers at CEL0 is 3.

The UE determines the non-anchor PRACH carrier index to be used at CEL0 based on the indicated PRACH carrier Index: index2=1+PRACH carrier Index mod 3=1+3 mod 3=1.

The carrier having an index of 1 in index1, i.e., the non-anchor carrier 1, is determined as the PRACH carrier to be used by the UE for transmitting the PRACH signal.

On the non-anchor carrier 1, the UE calculates the sub-carrier ID to be used at CEL0 based on the indicated Subcarrier indication of NPRACH, according to, as a non-limiting example:

PRACH carrier ID=0+6 mod 12=6.

The UE transmits the PRACH signal, starting from a subframe satisfying $$\left(sf + \left\lfloor \frac{ns}{2} \right\rfloor\right) \bmod 640 = 8,$$

using a sub-carrier ID of 6 on the non-anchor carrier 1, where sf is a radio frame number and ns is a slot number.

If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \bmod 640 = 8,$$

using a sub-carrier ID of 6 on the non-anchor carrier 1.

If the number of random accesses initiated at CEL0 is 3 (which has not reached the total number threshold of 20), the UE increases the coverage level to CEL1 and obtains the non-anchor PRACH resource corresponding to the level. Table 21 shows the PRACH resource information for non-anchor carriers at CEL1.

TABLE 21

| Carrier ID | Coverage level | PRACH period | PRACH start subframe offset | PRACH sub-carrier | Threshold for no. of random accesses (with a total number of 20) |
|---|---|---|---|---|---|
| Non-anchor carrier 1 | CEL1 | 640 ms | 64 ms | 12-23 | 3 |
| Non-anchor carrier 2 | CEL1 | 640 ms | 64 ms | 12-23 | 3 |

The non-anchor carriers are numbered, starting from 0, according to their orders in a list of carriers configured by system broadcast as shown in Table 5. The non-anchor carrier 1 is numbered as 0 and the non-anchor carrier 2 is numbered as 1. A list of the numbers 0-1 is denoted as index1, i.e., index1=[0,1], corresponding to {non-anchor carrier 1, non-anchor carrier 2}. Meanwhile, it knows that the number of non-anchor PRACH carriers at CEL0 is 2.

The UE determines the PRACH carrier index to be used at CEL1 based on the indicated PRACH carrier Index: index2=PRACH carrier Index mod 2=3 mod 2=1.

The carrier having an index of 1 in index1, i.e., the non-anchor carrier 2, is determined as the PRACH carrier to be used by the UE for transmitting the PRACH signal.

On the non-anchor carrier 2, the UE calculates the sub-carrier ID to be used at CEL1 based on the indicated Subcarrier indication of NPRACH, according to, as a non-limiting example:

PRACH carrier ID=12+6 mod 12=18.

The UE retransmits the PRACH signal, starting from a subframe satisfying $$\left(sf + \left\lfloor \frac{ns}{2} \right\rfloor\right) \mod 640 = 8,$$

using a sub-carrier ID of 18 on the non-anchor carrier 2.

The above steps are repeated until the random access succeeds or until the maximum number of repetitions min (3+3+3,20)=9 is reached.

A further optional example is provided according to the present disclosure.

An NB-IoT system is configured with three coverage levels, CEL0, CEL1 and CEL2, among which CEL0 is the lowest coverage level. An NB-IoT cell is configured with one anchor carrier and three non-anchor carriers. The PRACH resource information for these five carriers is shown in Table 22, which gives PRACH information configured by means of NB-IoT system broadcast.

TABLE 22

| Carrier ID | Coverage level | PRACH period | PRACH start subframe offset | PRACH sub-carrier | Threshold for no. of random accesses (with a total number of 20) |
|---|---|---|---|---|---|
| Anchor carrier | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 1 | CEL0 | 640 ms | 8 ms | 0-11 | 3 |
|  | CEL1 | 640 ms | 64 ms | 12-23 | 3 |
|  | CEL2 | 640 ms | 256 ms | 24-35 | 3 |
| Non-anchor carrier 2 | CEL0 | 640 ms | 8 ms | 0-11 | 3 |
|  | CEL1 | 640 ms | 64 ms | 12-23 | 3 |
| Non-anchor carrier 3 | CEL0 | 640 ms | 8 ms | 0-11 | 3 |

An base station transmits a PDCCH order indicating PRACH information as shown in Table 23.

TABLE 23

|  | Description | Value |
|---|---|---|
| Starting number of NPRACH repetitions | Coverage level at which UE transmits PRACH initially, i.e., UE initiates random access over a PRACH resource set corresponding to the coverage level initially | CEL0 |
| Subcarrier indication of NPRACH | Frequency-domain sub-carrier ID (NB-IoT) for UE to transmit PRACH | 6 |
| PRACH carrier Index | Carrier index for UE to transmit PRACH initially | 3 |

A Rel-14 UE receives the PDCCH order. The indicated PRACH carrier Index is a particular value (assumed to be 0). Then, the UE obtains an initial coverage level of CEL0 and PRACH resource information for the anchor carrier corresponding to CEL0. The PRACH resource information for the anchor carrier corresponding to CEL0 is shown in Table 24.

TABLE 24

| Carrier ID | Coverage level | PRACH period | PRACH start subframe offset | PRACH sub-carrier | Threshold for no. of random accesses (with a total number of 20) |
|---|---|---|---|---|---|
| anchor carrier | CEL0 | 640 ms | 8 ms | 0-11 | 3 |

On the anchor carrier, the UE calculates the sub-carrier ID to be used at CEL0 based on the indicated Subcarrier indication of NPRACH, according to, as a non-limiting example:

PRACH carrier ID=0+6 mod 12=6.

The UE transmits the PRACH signal, starting from a subframe satisfying $$\left(sf + \left\lfloor \frac{ns}{2} \right\rfloor\right) \mod 640 = 8,$$

using a sub-carrier ID of 6 on the anchor carrier, where sf is a radio frame number and ns is a slot number.

If the initiated random access process fails and the number of random accesses initiated at CEL0 is smaller than 3, the PRACH signal is retransmitted, starting from a subframe satisfying $$\left(sf + \left\lfloor \frac{ns}{2} \right\rfloor\right) \mod 640 = 8,$$

using a sub-carrier ID of 6 on the anchor carrier.

If the number of random accesses initiated at CEL0 is 3 (which has not reached the total number threshold of 20), the UE increases the coverage level to CEL1 and obtains the non-anchor PRACH resource corresponding to the level, as shown in Table 25.

TABLE 25

| Carrier ID | Coverage level | PRACH period | PRACH start subframe offset | PRACH sub-carrier | Threshold for no. of random accesses (with a total number of 20) |
| --- | --- | --- | --- | --- | --- |
| anchor carrier | CEL1 | 640 ms | 64 ms | 12-23 | 3 |

On the anchor carrier, the UE calculates the sub-carrier ID to be used at CEL1 based on the indicated Subcarrier indication of NPRACH, according to, as a non-limiting example:

PRACH carrier ID=12+6 mod 12=18.

The UE retransmits the PRACH signal, starting from a subframe satisfying $$\left(sf + \left\lfloor \frac{ns}{2} \right\rfloor\right) \mod 640 = 8,$$

using a sub-carrier ID of 18 on the anchor carrier.

The above steps are repeated until the random access succeeds or until the maximum number of repetitions min (3+3+3,20)=9 is reached.

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present disclosure, in essence or in terms of parts contributing to the prior art, can be embodied in the form of a software product, which is stored in a storage medium (e.g., ROM/RAM, disc, CD-ROM) and includes a number of instructions for enabling a terminal device (which may be a mobile phone, a computer, a server, or a network device, etc.) to perform the method described in the various embodiments of the present disclosure.

Embodiment 2

According to an embodiment of the present disclosure, an apparatus for random access in a wireless communication system is also provided. The apparatus can implement the above embodiments and preferably embodiments and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 5:
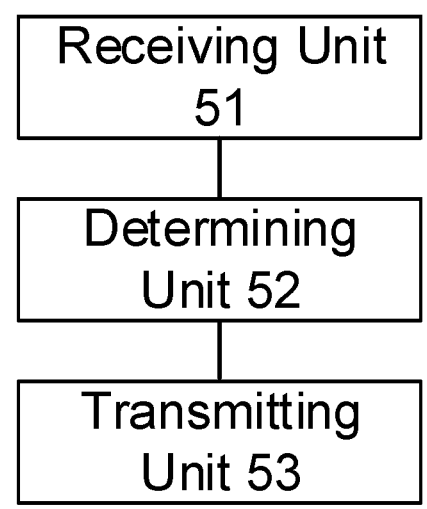
FIG. 5 is a schematic diagram showing an apparatus for random access in a wireless communication system according to the present disclosure.

FIG. 5 is a schematic diagram showing an apparatus for random access in a wireless communication system according to the present disclosure. As shown in FIG. 5, the apparatus can include a receiving unit 51, a determining unit 52 and a transmitting unit 53.

The receiving unit 51 is configured to receive indication information transmitted from a radio base station. The indication information instructs a user terminal to initiate a random access.

The determining unit 52 is configured to determine a target Physical Random Access Channel (PRACH) resource from available resources based on a current coverage level and resource information carried in the indication information. The target PRACH resource is used for transmitting a PRACH signal for initiating the random access. The current coverage level is a coverage level at which the random access is to be initiated currently.

The transmitting unit 53 is configured to re-determine, in response to a failure to initiate the random access over the target PRACH resource, the target PRACH resource from the available resources based on an updated coverage level and the resource information, and transmit the PRACH signal over the re-determined target PRACH resource.

With the above embodiments, the receiving unit receives indication information transmitted from a radio base station. The indication information instructs a user terminal to initiate a random access. The determining unit determines a target PRACH resource from available resources based on a current coverage level and resource information carried in the indication information. The target PRACH resource is used for transmitting a PRACH signal for initiating the random access. The transmitting unit re-determines, in response to a failure to initiate the random access over the target PRACH resource, the target PRACH resource from the available resources based on an updated coverage level and the resource information, and transmits the PRACH signal over the re-determined target PRACH resource. In this way, it is possible to solve the technical problem in the related art associated with low success rate of random accesses initiated by radio base stations, thereby achieving a technical effect of an increased success rate of random accesses.

When the receiving unit receives the indication information transmitted from the radio base station, it can receive the indication information as PDCCH order information.

When the determining unit determines the target PRACH resource from available resources based on the current coverage level and the resource information carried in the indication information, it can map the resource information to the target PRACH resource from resources available at the current coverage level. In particular, it can determine the target PRACH resource in a manner corresponding to a system type of the radio base station.

When the wireless communication system is an enhanced Machine Type Communication (eMTC) system, the target PRACH resource includes a target time-frequency resource and a target codeword for transmitting the PRACH signal. The determining unit includes: a second determining module configured to determine the target time-frequency resource based on a number of time-frequency resources available at the current coverage level and a time-frequency resource index in the resource information; and/or a third determining module configured to determine the target codeword based on a start codeword and an end codeword of preambles at the current coverage level and a preamble index in the resource information.

Optionally, the second determining module is further configured to: calculate a first index, ID2, based on the number, Num1, of the available time-frequency resources and the time-frequency resource index, ID1, in the resource information according to a predetermined equation of ID2=(ID1−K1)mod(Num1)+K2 or ID2=(ID1)mod(Num1)+K3, where K1, K2 and K3 are constants; and determine a time-frequency resource corresponding to ID2 as the target time-frequency resource.

Optionally, the third determining module is further configured to: calculate a second index, ID6, based on an index, ID3, of the start codeword, an index, ID4, of the end codeword and the preamble index, ID5, as ID6=ID3+(ID5)mod(ID4−ID3+1), or calculate the second index ID6 based on the index ID3 of the start codeword, the index ID4 of the end codeword and a start codeword index, ID9, corresponding to a coverage level indicated in the indication information, as ID6=ID3+(ID5−ID9)mod(ID4−ID3+1); and determine a codeword corresponding to ID6 as the target codeword.

When the wireless communication system is a Narrow Band Internet of Things (NB-IoT) system, the target PRACH resource includes a target sub-carrier for transmitting the PRACH signal. The determining unit includes: a fourth determining unit configured to determine the target sub-carrier based on a number of sub-carriers and an index of a start sub-carrier at the current coverage level and a sub-carrier index or offset in the resource information.

Optionally, the fourth determining module is further configured to: calculate a third index, ID8, based on the number, Num2, of sub-carriers and the index, ID7, of the start sub-carrier at the current coverage level and the sub-carrier offset, Num3, in the resource information, as ID8=ID7+(Num3)mod(Num2), or calculate the third index, ID8, based on the number Num2 of sub-carriers and the index ID7 of the start sub-carrier at the current coverage level, the sub-carrier index Num3 in the resource information and a start sub-carrier index, ID10, corresponding to a coverage level indicated in the indication information, as ID8=ID7+(Num3-ID10)mod(Num2); and determine the sub-carrier corresponding to ID8 as the target sub-carrier.

The above transmitting unit includes: an obtaining module configured to obtain a number of failures to initiate the random access; and a first determining module configured to determine the failure to initiate the random access over the target PRACH resource when the number of failures reaches a predetermined value that is a maximum number of transmissions of the PRACH signal allowable at the current coverage level.

Optionally, the transmitting unit further includes: a transmitting module configured to retransmit, after obtaining the number of failures to initiate the random access, the PRACH signal over the target PRACH resource when the number of failures is smaller than the predetermined value.

It is to be noted that the updated coverage level is one level higher than the coverage level before updating.

It should be noted that each of the above-described modules can be implemented by means of software or hardware, and the latter can be implemented by, but not limited to, the following manner: the above-mentioned modules can be located at the same processor, or any combination of the above-mentioned modules can be distributed over a plurality of processors.

Embodiment 3

According to an embodiment of the present disclosure, a storage medium is also provided. The storage medium can be configured to store program codes for the following steps.

At S1, indication information transmitted from a radio base station is received. The indication information instructs a user terminal to initiate a random access.

At S2, a target PRACH resource is determined from available resources based on a current coverage level and resource information carried in the indication information. The target PRACH resource is used for transmitting a PRACH signal for initiating the random access.

At S3, in response to a failure to initiate the random access over the target PRACH resource, the target PRACH resource is re-determined from the available resources based on an updated coverage level and the resource information, and the PRACH signal is transmitted over the re-determined target PRACH resource.

Alternatively, in the present embodiment, the above-described storage medium may include, but not limited to, a USB disk, a Read-Only Memory (ROM), a Random Access Memory (RAM), a mobile hard disk, a magnetic Disc or CD-ROM and other media that can store program code.

Optionally, in the present embodiment, the processor executes, in accordance with the program code stored in the storage medium, steps of: receiving indication information transmitted from a radio base station, the indication information instructing a user terminal to initiate a random access; determining a target Physical Random Access Channel (PRACH) resource from available resources based on a current coverage level and resource information carried in the indication information, the target PRACH resource being used for transmitting a PRACH signal for initiating the random access; and re-determining, in response to a failure to initiate the random access over the target PRACH resource, the target PRACH resource from the available resources based on an updated coverage level and the resource information, and transmitting the PRACH signal over the re-determined target PRACH resource.

Optionally, regarding the specific examples in this embodiment, reference can be made to the above embodiments and the examples described in optional embodiments, and the details thereof will be omitted here.

It will be apparent to those skilled in the art that the above-described modules or steps of the present disclosure may be implemented by means of a general purpose computing device, and may be placed at a single computing device or distributed over a network of multiple computing devices. Optionally, they may be implemented by means of program code executable by the computing device, so that they may be stored in a storage device and executed by a computing device, and in some cases, they may be performed in a different order from the steps shown or described here, or they may be made separately into individual integrated circuit modules, or may be implemented by making multiple modules or steps therein into a single integrated circuit module. Thus, the present disclosure is not limited to any particular hardware, software, and the combination thereof.

The foregoing is merely illustrative of the preferred embodiments of the present disclosure and is not intended to limit the present disclosure. Various changes and modifications may be made by those skilled in the art. Any modifications, equivalent substitutions, improvements, and the like within the spirit and principles of the disclosure are intended to be included within the scope of the present disclosure.

What is claimed is:

1. A method for wireless communication, comprising:
receiving, at a mobile device, a message from a base station for initiating a random access procedure, wherein the message includes a subcarrier indication;
selecting a random access channel resource using a sum of (1) an index of a first subcarrier allocated to the random access channel, and (2) the subcarrier indication modulo a number of subcarriers allocated to the random access channel; and
transmitting a random access signal using the selected random access channel resource for the random access procedure.

2. The method of claim 1, further comprising:
re-selecting, in response to a failure of the random access procedure, a second random access channel resource based on an updated coverage level and the subcarrier indication; and
transmitting the random access signal using the second random access channel resource.

3. A method for wireless communication, comprising:
transmitting, from a base station, a message to a mobile device for initiating a random access procedure, wherein the message includes a subcarrier indication; and
receiving, at the base station, a random access signal for the random access procedure from the mobile device using a random access channel resource indicated by the subcarrier indication, wherein the random access channel resource is determined using a sum of (1) an index of a first subcarrier allocated to the random access channel, and (2) the subcarrier indication modulo a number of subcarriers allocated to the random access channel.

4. The method of claim 3, further comprising:
receiving, in response to a failure of the random access procedure, the random access signal using a second random access channel resource determined based on an updated coverage level and the subcarrier indication.

5. An apparatus for wireless communication, comprising:
a receiver configured to receive a message from a base station for initiating a random access procedure, wherein the message includes a subcarrier indication for initiating a random access procedure;
a processor configured to select a random access channel resource using a sum of (1) an index of a first subcarrier allocated to the random access channel, and (2) the subcarrier indication modulo a number of subcarriers allocated to the random access channel; and
a transmitter configured to transmit a random access signal using the selected resource for the random access procedure.

6. The apparatus of claim 5, wherein the processor is configured to re-select, in response to a failure of the random access procedure, a second random access channel resource based on an updated coverage level and the subcarrier indication, and the transmitter is configured to transmit the random access signal using the second random access channel resource.

7. An apparatus for wireless communication, comprising:
a transmitter configured to transmit a message to a mobile device for initiating a random access procedure, wherein the message includes a subcarrier indication; and
a receiver configured to receive a random access signal for the random access procedure from the mobile device using a random access resource indicated by the subcarrier indication, wherein the random access resource is determined using a sum of (1) an index of a first subcarrier allocated to the random access channel, and (2) the subcarrier indication modulo a number of subcarriers allocated to the random access channel.

8. The apparatus of claim 7, wherein the receiver is configured to receive, in response to a failure of the random access procedure, the random access signal using a second random access channel resource determined based on an updated coverage level and the subcarrier indication.

* * * * *